US012794017B2

(12) United States Patent
Kim et al.

(10) Patent No.: US 12,794,017 B2
(45) Date of Patent: Nov. 10, 2026

(54) ELECTROLYTE COMPOSITIONS FOR RECHARGEABLE METAL HALIDE BATTERY

(71) Applicants: International Business Machines Corporation, Armonk, NY (US); Central Glass Co., Ltd., Chiyoda-ku (JP)

(72) Inventors: Jangwoo Kim, San Jose, CA (US); Maxwell Giammona, Pleasanton, CA (US); Young-hye Na, San Jose, CA (US); Masafumi Oda, Asaka (JP); Tsubasa Itakura, Miyoshi (JP); Toru Tanaka, Miyoshi (JP); Katsutoshi Suzuki, Hino (JP); Kazunari Takeda, Tsurugashima (JP)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 16/858,665

(22) Filed: Apr. 26, 2020

(65) Prior Publication Data

US 2021/0336296 A1 Oct. 28, 2021

(51) Int. Cl.

*H01M 10/05* (2010.01)
*H01M 4/131* (2010.01)
*H01M 4/134* (2010.01)
*H01M 4/62* (2006.01)
*H01M 4/66* (2006.01)

(Continued)

(52) U.S. Cl.

CPC ....... *H01M 10/0569* (2013.01); *H01M 4/131* (2013.01); *H01M 4/134* (2013.01); *H01M 4/622* (2013.01); *H01M 4/661* (2013.01); *H01M 4/663* (2013.01); *H01M 10/0525* (2013.01); *H01M 2004/021* (2013.01)

(58) Field of Classification Search

None

See application file for complete search history.

(56) References Cited

U.S. PATENT DOCUMENTS 3,565,692 A 2/1971 Weininger
3,640,770 A 2/1972 Zito, Jr.

(Continued)

FOREIGN PATENT DOCUMENTS

AU 2021263028 B2 7/2022
CN 115836419 B 3/2026

(Continued)

OTHER PUBLICATIONS

Machine translation of JP 2004047416 A.*

(Continued)

*Primary Examiner* — Jonathan G Leong
*Assistant Examiner* — Tony S Chuo
(74) *Attorney, Agent, or Firm* — CHIP LAW GROUP

(57) ABSTRACT

A rechargeable metal halide battery with an optimized electrolyte formulation shows high capacity at fast charging rates. The optimized electrolyte includes a metal halide, an oxidizing gas, and a mixed-solvent solution that includes a glyme-based compound that is in a volume fraction of between 20-70 volume % of the mixed-solvent solution. The mixed-solvent solution may further include a nitrile compound and/or a heterocyclic compound.

19 Claims, 9 Drawing Sheets

(51) Int. Cl.

| | |
|---|---|
| ***H01M 10/0525*** | (2010.01) |
| ***H01M 10/0569*** | (2010.01) |
| *H01M 4/02* | (2006.01) |

(56) References Cited

U.S. PATENT DOCUMENTS

| | | | | |
|---|---|---|---|---|
| 4,400,453 | A | 8/1983 | Blomgren et al. | |
| 5,411,820 | A | 5/1995 | Chaloner-Gill | |
| 5,567,547 | A | 10/1996 | Golovin et al. | |
| 6,632,573 | B1 | 10/2003 | Nimon et al. | |
| 6,984,367 | B2 | 1/2006 | Wietelmann et al. | |
| 8,658,304 | B2 | 2/2014 | Visco et al. | |
| 8,758,947 | B2 | 6/2014 | Zhang et al. | |
| 9,490,496 | B2 | 11/2016 | Tennessen et al. | |
| 10,224,577 | B2 | 3/2019 | Bhavaraju et al. | |
| 11,515,566 | B2 | 11/2022 | Giammona et al. | |
| 2003/0190527 | A1 | 10/2003 | Pugh et al. | |
| 2009/0269675 | A1 | 10/2009 | Huang | |
| 2010/0266907 | A1* | 10/2010 | Yazami | H01M 4/72 429/405 |
| 2012/0028137 | A1 | 2/2012 | Chase et al. | |
| 2015/0333353 | A1 | 11/2015 | Yazami et al. | |
| 2016/0156067 | A1* | 6/2016 | Suzuki | H01M 10/052 429/328 |
| 2016/0218394 | A1 | 7/2016 | Yamada et al. | |
| 2017/0125868 | A1 | 5/2017 | Kim et al. | |
| 2019/0006701 | A1* | 1/2019 | Dai | H01M 50/44 |
| 2019/0221887 | A1 | 7/2019 | Kim et al. | |
| 2021/0359287 | A1* | 11/2021 | Park | H01M 4/62 |
| 2021/0399340 | A1* | 12/2021 | Kuwajima | H01M 10/0567 |

FOREIGN PATENT DOCUMENTS

| | | | | |
|---|---|---|---|---|
| GB | 2230640 | A | 10/1990 | |
| JP | 2004047416 | A * | 2/2004 | H01M 4/58 |
| JP | 2009-064584 | A | 3/2009 | |
| JP | 2013161608 | A | 8/2013 | |
| KR | 101714126 | B1 | 6/2016 | |
| KR | 20170059396 | A | 5/2017 | |
| KR | 20180068117 | A | 6/2018 | |
| TW | I659010 | B | 5/2019 | |
| WO | 2014141726 | A1 | 9/2014 | |
| WO | 2021/219320 | A1 | 11/2021 | |

OTHER PUBLICATIONS

International Search Report and Written Opinion dated Aug. 3, 2021, for counterpart PCT/EP2021/058446, filed on Mar. 31, 2021.
International Search Report and Written Opinion dated Jul. 15, 2021, for commonly owned PCT application No. PCT/EP2021/058451, filed on Mar. 31, 2021.
Non-Final Office Action dated Apr. 4, 2022, in co-pending IBM U.S. Appl. No. 16/858,671.
Response as filed on Jun. 20, 2022, in response to the Non-Final Office Action dated Apr. 4, 2022, in co-pending IBM U.S. Appl. No. 16/858,671.
List of IBM Patents or Patent Applications Treated as Related.
U.S. Appl. No. 16/297,369, filed Mar. 8, 2019; Inventor Kim et al.; Applicant/Assignee International Business Machines Corporation.
Cabana et al., Beyond intercalation-based Li-ion batteries: The state of the art and challenges of electrode materials reacting through conversion reactions, Adv. Mater. 22:E170-E192 (2010).
Etacheri et al., Challenges in the development of advanced Li-ion batteries: a review, Energy Environ. Sci. 1:3243-3262 (2011).
Heller, Potentially implantable miniature batteries, Analytical and Bioanalytical Chemistry 385:469-473 (2006).
Karden et al., Energy storage devices for future hybrid electric vehicles, J. Power Sources 168:2-11 (2007).
Nitta et al., Li-ion battery materials: Present and future, Materials Today 18(5):252-264 (2015).
TARASCON & ARMAND, Issues and challenges facing rechargeable lithium batteries, Nature 414:359-67 (2001).
Ku, Nonaqueous liquid electrolytes for lithium-based rechargeable batteries, Chem. Rev. 104(10): 4303-4417 (2004).
Intellectual Property Office of Singapore, “First Written Opinion,” Jul. 1, 2025, 3 Pages, SG Application No. 11202261592W.
Intellectual Property Office of Singapore, “ Invitation to Respond to Written Opinion”, Jun. 23, 2025, 7 Pages, SG Application No. 11202261626Y.

* cited by examiner

ELECTROLYTE COMPOSITIONS FOR RECHARGEABLE METAL HALIDE BATTERY

JOINT RESEARCH AGREEMENT

The subject matter of this disclosure describes activities undertaken within the scope of a joint research agreement that was in place before the effective date of the instant application. The parties to the joint research agreement are International Business Machines Corporation (Armonk, New York, USA) and Central Glass Co., Ltd. (Tokyo, Japan).

TECHNICAL FIELD

The present invention relates generally to rechargeable batteries and, more specifically, to electrolyte compositions for rechargeable metal halide batteries.

BACKGROUND OF THE INVENTION

Rechargeable batteries are high in demand for a wide range of applications, from small batteries for industrial and medical devices, to larger batteries for electric vehicles and grid energy storage systems. Each application requires a range of electrochemical properties, yet much of the today's battery performance is still considered a limiting factor for satisfying the high standard of the customers' needs.

There are currently two types of rechargeable batteries: batteries that run via electrochemical intercalation/de-intercalation behavior of acting ions, such as lithium ion batteries; and batteries that run via a conversion reaction of active electrode/electrolyte materials, such as nickel metal hydride (NiMH) batteries. The most well-known and widely used rechargeable batteries are lithium-ion batteries that use an intercalated lithium compound as one electrode material, which allows lithium ions to move back and forth in an electrolyte pond. NiMH batteries use a nickel hydroxide as a positive electrode, a hydrogen-absorbing alloy as a negative electrode, and an alkaline electrolyte (e.g., potassium hydroxide).

Lithium-ion and NiMH batteries have shortcomings that are preventing these batteries from moving forward into a wider range of applications. These shortcomings include slow charging speeds and the high cost of the heavy metal cathode materials required to manufacture the batteries.

SUMMARY OF THE INVENTION

The present invention overcomes the shortcomings in the art by providing a rechargeable metal halide battery with an optimized electrolyte formulation.

In one embodiment, the present invention relates to a battery, comprising: an anode; an electrolyte; and a cathode current collector contacting the electrolyte, wherein the electrolyte facilitates transport of ions between the anode and the cathode current collector and wherein the electrolyte comprises: (i) a mixed-solvent comprising at least two organic liquid compounds, wherein at least one of the organic liquid compounds is a glyme-based compound having the chemical formula, $R^1O—(CR^2_2CR^2_2O)_n—R^1$, wherein, n is an integer greater than 0, $R^1$ is independently substituted or unsubstituted alkyl, alkenyl, alkynyl, aryl, or alkylaryl, $R^2$ is independently hydrogen or substituted or unsubstituted alky, alkenyl, alkynyl, aryl, or alkylaryl, and the glyme-based compound has a volume fraction between 20-70 volume % of the mixed-solvent, (ii) a metal halide that functions as an active cathode material, wherein the metal halide is dissolved in the mixed-solvent, and (iii) an oxidizing gas dissolved in the mixed-solvent.

In another embodiment, the present invention relates to an electrolyte for a rechargeable battery comprising: (i) a mixed-solvent comprising at least two organic liquid compounds, wherein at least one of the organic liquid compounds is a glyme-based compound having the chemical formula, $R^1O—(CR^2_2CR^2_2O)_n—R^1$, wherein, n is an integer greater than 0, $R^1$ is independently substituted or unsubstituted alkyl, alkenyl, alkynyl, aryl, or alkylaryl, $R^2$ is independently hydrogen or substituted or unsubstituted alky, alkenyl, alkynyl, aryl, or alkylaryl, and the glyme-based compound has a volume fraction between 20-70 volume % of the mixed-solvent, (ii) a metal halide dissolved in the mixed-solvent, and (iii) an oxidizing gas dissolved in the mixed-solvent.

In a further embodiment, the present invention relates to a rechargeable battery, comprising: an anode; a cathode current collector; and an electrolyte that facilitates transport of ions between the anode and the cathode current collector, wherein the cathode current collector is in contact with the electrolyte and the electrolyte comprises: (i) lithium iodide dissolved in a mixed-solvent, and an oxidizing gas dissolved in the mixed-solvent, wherein the mixed-solvent comprises 1,2-dimethoxyethane and (ii) at least one additional organic compound.

In another embodiment, the anode comprises one or more alkali metals and/or one or more alkali earth metals.

In a further embodiment, the cathode current collector comprises a porous carbon material and/or a metal.

In another embodiment, the porous carbon material is selected from the group consisting of carbon cloth, carbon nanoparticles, polymer binders, and combinations thereof.

In one aspect, the present invention relates to a method of preparing an electrolyte for a metal halide rechargeable battery, the method comprising: dissolving a metal halide in a mixed-solvent solution; and introducing an oxidizing gas into the mixed-solvent solution, wherein the mixed-solvent solution comprises at least two organic liquid compounds, wherein at least one of the at least two organic liquid compounds is a glyme-based compound having the chemical formula, $R^1O—(CR^2_2CR^2_2O)_n—R^1$, wherein, n is an integer greater than 0, $R^1$ is independently substituted or unsubstituted alkyl, alkenyl, alkynyl, aryl, or alkylaryl, $R^2$ is independently hydrogen or substituted or unsubstituted alkyl, alkenyl, alkynyl, aryl, or alkylaryl, and the glyme-based compound has a volume fraction between 20-70 volume % of the mixed-solvent solution.

In another aspect, the present invention relates to a method of fabricating a metal halide rechargeable battery, the method comprising: dissolving a metal halide in a mixed-solvent solution to form an electrolyte solution; forming a soaked separator by soaking a separator in the electrolyte solution; forming a stack comprising an anode, the soaked separator, and a cathode current collector, wherein the soaked separator is placed between the anode and the cathode current collector, the cathode current collector is in contact with the electrolyte, and the electrolyte facilitates transport of ions between the anode and the cathode current collector; introducing an oxidizing gas into the stack, wherein the mixed-solvent solution comprises at least two organic liquid compounds, wherein at least one of the at least two organic liquid compounds is a glyme-based compound having the chemical formula, $R^1O—(CR^2_2CR^2_2O)_n—R^1$, wherein, n is an integer greater than 0, $R^1$ is independently substituted or unsubstituted alkyl, alkenyl, alkynyl, aryl, or alkylaryl, $R^2$ is independently hydrogen or substituted or unsubstituted alkyl, alkenyl, alkynyl, aryl, or alkylaryl, and the glyme-based compound has a volume fraction between 20-70 volume % of the mixed-solvent solution.

In a further aspect, the present invention relates to a method of preparing an electrolyte for a metal halide rechargeable battery, the method comprising: mixing a metal halide, an oxidizing gas, and ingredients of a mixed-solvent solution, wherein the mixed-solvent solution comprises at least two organic liquid compounds, wherein at least one of the at least two organic liquid compounds is a glyme-based compound having the chemical formula, $R^1O—(CR^2_2CR^2_2O)_n—R^1$, wherein, n is an integer greater than 0, $R^1$ is independently substituted or unsubstituted alkyl, alkenyl, alkynyl, aryl, or alkylaryl, $R^2$ is independently hydrogen or substituted or unsubstituted alkyl, alkenyl, alkynyl, aryl, or alkylaryl, and the glyme-based compound has a volume fraction between 20-70 volume % of the mixed-solvent solution.

In another aspect, the present invention relates to a method of fabricating a metal halide rechargeable battery, the method comprising: mixing a metal halide, an oxidizing gas, and ingredients of a mixed-solvent solution to form an electrolyte solution; forming a soaked separator by soaking a separator in the electrolyte solution; forming a stack comprising an anode, the soaked separator, and a cathode current collector, wherein the soaked separator is placed between the anode and the cathode current collector, the cathode current collector is placed in contact with the electrolyte solution, and the metal halide acts as an active cathode material; wherein the mixed-solvent solution comprises at least two organic liquid compounds, wherein at least one of the at least two organic liquid compounds is a glyme-based compound having the chemical formula, $R^1O—(CR^2_2CR^2_2O)_n—R^1$, wherein, n is an integer greater than 0, $R^1$ is independently substituted or unsubstituted alkyl, alkenyl, alkynyl, aryl, or alkylaryl, $R^2$ is independently hydrogen or substituted or unsubstituted alkyl, alkenyl, alkynyl, aryl, or alkylaryl, and the glyme-based compound has a volume fraction between 20-70 volume % of the mixed-solvent solution.

In other embodiments and aspects, $R^1$ is independently selected from the group consisting of a $C_1$-$C_{10}$ linear alkyl, a $C_3$-$C_{10}$ branched alkyl, a $C_3$-$C_{10}$ cyclic alkyl, a $C_2$-$C_{10}$ linear alkenyl, a $C_3$-$C_{10}$ branched alkenyl, a $C_3$-$C_{10}$ cyclic alkenyl, and a $C_5$-$C_{10}$ aryl; and $R^2$ is independently selected from the group consisting of hydrogen, a $C_1$-$C_{10}$ linear alkyl, a $C_3$-$C_{10}$ branched alkyl, a $C_3$-$C_{10}$ cyclic alkyl, a $C_2$-$C_{10}$ linear alkenyl, a $C_3$-$C_{10}$ branched alkenyl, a $C_3$-$C_{10}$ cyclic alkenyl, and a $C_5$-$C_{10}$ aryl.

In further embodiments and aspects, $R^1$ is independently selected from the group consisting of a $C_1$-$C_{10}$ linear alkyl halide, a $C_3$-$C_{10}$ branched alkyl halide, a $C_3$-$C_{10}$ cyclic halide alkyl group, a $C_2$-$C_{10}$ linear alkenyl halide group, a $C_3$-$C_{10}$ branched alkenyl halide group, a $C_3$-$C_{10}$ cyclic alkenyl halide group, and a $C_5$-$C_{10}$ aryl halide group; and $R^2$ is independently selected from the group consisting of hydrogen, a $C_1$-$C_{10}$ linear alkyl halide, a $C_3$-$C_{10}$ branched alkyl halide, a $C_3$-$C_{10}$ cyclic halide alkyl group, a $C_2$-$C_{10}$ linear alkenyl halide group, a $C_3$-$C_{10}$ branched alkenyl halide group, a $C_3$-$C_{10}$ cyclic alkenyl halide group, and a $C_5$-$C_{10}$ aryl halide group.

In other embodiments and aspects, $R^1$ is independently selected from the group consisting of an $X_1—X_{10}$ linear alkyl, an $X_3—X_{10}$ branched alkyl, a $X_3—X_{10}$ cyclic alkyl, a $X_2—X_{10}$ linear alkenyl, a $X_3—X_{10}$ branched alkenyl, a $X_3—X_{10}$ cyclic alkenyl, and a $X_5—X_{10}$ aryl, wherein each X is a carbon, a nitrogen, an oxygen, or a silicon atom; and $R^2$ is independently selected from the group consisting of hydrogen, an $X_1—X_{10}$ linear alkyl, an $X_3—X_{10}$ branched alkyl, a $X_3—X_{10}$ cyclic alkyl, a $X_2—X_{10}$ linear alkenyl, a $X_3—X_{10}$ branched alkenyl, a $X_3—X_{10}$ cyclic alkenyl, and a $X_5—X_{10}$ aryl, wherein each X is a carbon, a nitrogen, an oxygen, or a silicon atom.

In further embodiments and aspects, at least one hydrogen atom of the linear, branched, or cyclic alkyl, alkenyl, and aryl $R^1$ and/or $R^2$ groups is substituted with a halogen atom.

In other embodiments and aspects, at least one carbon atom of the linear, branched, or cyclic alkyl, alkenyl, and aryl $R^1$ and/or $R^2$ groups is replaced with a nitrogen, an oxygen, or a silicon atom.

In further embodiments and aspects, the glyme-based compound is 1,2-dimethoxyethane.

In other embodiments and aspects, the metal halide is lithium iodide.

In further embodiments and aspects, the mixed-solvent/organic compound comprises a nitrile compound and/or a heterocyclic compound.

In other embodiments and aspects, the nitrile is methoxyproprionitrile and/or ethylene glycol bis(propionitrile).

In further embodiments and aspects, the heterocyclic compound is 1,3-dioxolane.

In other embodiments and aspects, the electrolyte further comprises an additional lithium salt selected from the group consisting of lithium nitrate ($LiNO_3$), lithium fluoride (LiF), lithium bis(trifluoromethanesulfonyl)imide (LiTFSI; $LiC_2F_6NO_4S_2$), lithium trifluoromethanesulfonate ($LiCF_3SO_3$), lithium hexafluorophosphate ($LiPF_6$), lithium hexafluoroarsenate ($LiAsF_6$), lithium perchlorate ($LiClO_4$), and lithium tetrafluoroborate ($LiBF_4$).

In further embodiments and aspects, the oxidizing gas is selected from the group consisting of oxygen, air, nitric oxide, nitrogen dioxide, and mixtures and combinations thereof.

In other embodiments and aspects, the metal halide is dissolved in the mixed-solvent at a cathode loading amount of >25 mg/cm$^2$ (metal halide/cathode surface area).

In further embodiments and aspects, the metal halide is dissolved in the mixed-solvent at a cathode loading amount of 24-31 mg/cm$^2$ (metal halide/cathode surface area).

In other embodiments and aspects, the metal halide is dissolved in the mixed-solvent at a cathode loading amount of at least 28 mg/cm$^2$ (metal halide/cathode surface area).

In further embodiments and aspects, the metal halide is dissolved in the mixed-solvent at a cathode loading amount of at least 31 mg/cm$^2$ (metal halide/cathode surface area).

Additional aspects and embodiments of the invention will be provided, without limitation, in the detailed description of the invention that is set forth below.

BRIEF DESCRIPTION OF THE DRAWINGS

FIG. 2A is a graph showing charge-discharge profiles at a current density of 5 mA/cm$^2$, and FIG. 2B is a column chart displaying discharge specific capacities against the DME volume fraction shown in FIG. 2A.

FIG. 3A is a graph showing charge-discharge profiles at a current density of 1 mA/$cm^2$ and FIG. 3B is a column chart displaying discharge specific capacities against the DME volume fraction shown in FIG. 3A.

FIG. 5A is a graph showing cycle life variation with different volume fractions of ethylene glycol bis(propionitrile) (EGBP) solvent in 0.5 volume fraction of glyme-based compound mixed electrolyte. FIG. 5B is a graph showing cycle life comparison of MPN:DME (50:50 in volume) alone and MPN:DME (50:50 in volume) containing 10% EGBP by volume.

DETAILED DESCRIPTION OF THE INVENTION

Figure 1:
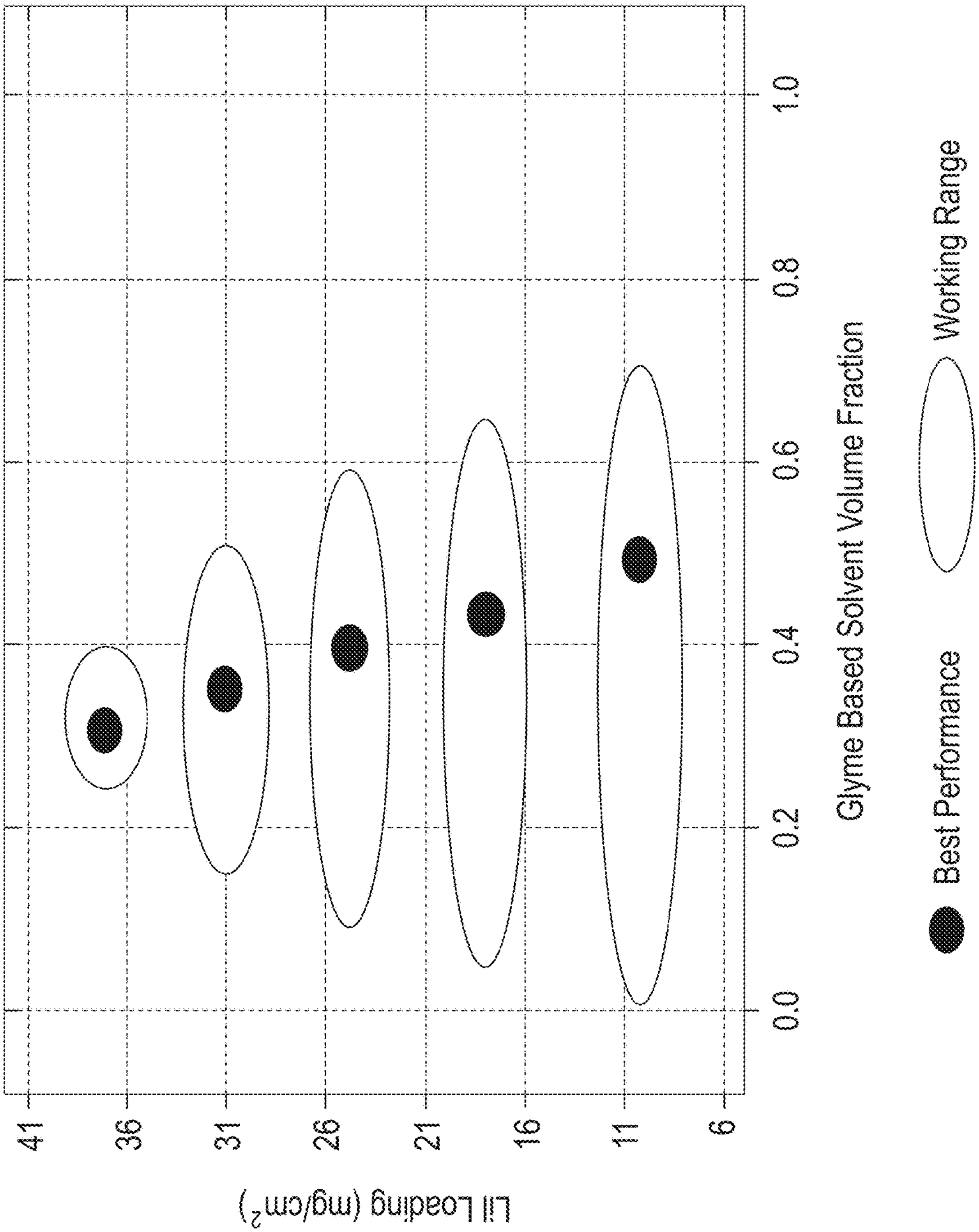
FIG. 1 is a graph showing the volume fraction working range and best performance range for the metal halide battery electrolyte glyme-based solvent described herein against metal halide loading concentration.

Set forth below is a description of what are currently believed to be preferred aspects and/or embodiments of the claimed invention. Any alternates or modifications in function, purpose, or structure are intended to be covered by the appended claims. As used in this specification and the appended claims, the singular forms "a," "an," and "the" include plural referents unless the context clearly dictates otherwise. The terms "comprise," "comprised," "comprises," and/or "comprising," as used in the specification and appended claims, specify the presence of the expressly recited components, elements, features, and/or steps, but do not preclude the presence or addition of one or more other components, elements, features, and/or steps.

As used herein, the term "anode" refers to the negative or reducing electrode of a battery cell that releases electrons to an external circuit and oxidizes during an electrochemical process.

As used herein, the term "cathode" refers to the positive or oxidizing electrode of a battery cell that acquires electrons from the external circuit and is reduced during the electrochemical process.

As used herein, the term "electrolyte" refers to a material that provides ion transport between the anode and cathode of a battery cell. An electrolyte acts as a catalyst for battery conductivity through its interaction with the anode and the cathode. Upon battery charging, an electrolyte promotes the movement of ions from the cathode to the anode and on discharge, the electrolyte promotes the movement of ions from the anode to the cathode.

As used herein, the term "oxidizing gas" refers to a gas that induces a reduction-oxidation (redox) reaction in a redox battery. Examples of oxidizing gases include, without limitation, oxygen, air, nitric oxide, nitrogen dioxide, and mixtures and combinations thereof. As is known to those of skill in the art, a redox reaction is a reaction that transfers electrons between (i) a reducing agent that undergoes oxidation through the loss of electrons and (ii) an oxidizing agent that undergoes reduction through the gain of electrons. A redox battery is a rechargeable electrochemical cell where chemical energy is provided by two electrolytes separated by an ion-exchange membrane. In operation, ion exchange, accompanied by a flow of electric current, occurs through the ion-exchange membrane while the electrolytes circulate in their respective spaces.

As used herein, the term "metal halide" refers to a compound having a metal and a halogen. The metals of metal halides may be any metal in Groups 1 to 16 of the periodic chart but will typically be Group 1 alkali metals. The halides of the metal halides will be any halogen in Group 17 of the periodic chart. One metal halide used in the rechargeable batteries described herein is "lithium-iodide" or "LiI," which is a lithium and iodine compound that is used as a cathode material and dissolved in electrolyte.

As used herein, the term "glyme" refers to a glycol ether class of solvents that do not carry free hydroxyl groups. Due to their lack of functional groups, glyme solvents are chemically inert and aprotic (lacking H atoms/incapable of H-bonding) polar solvents. Glymes have the general chemical formula: $R^1O—(CR^2_2CR^2_2O)_n—R^1$. Examples of glyme solvents include, without limitations, 1,2-dimethoxyethane (DME), 1,2-diethoxyethane, 2-methoxyethyl ether (diglyme), 1,2-Bis(2-methoxyethoxy) ethane (triglyme), and Bis [2-(2-methoxyethoxy)ethyl]ether (tetraglyme). Glymes are less volatile and less toxic than most organic solvents used in traditional battery manufacturing processes.

As used herein, the term "nitrile" refers to an organic chemical that contains at least one cyano functional group in which the carbon and nitrogen atoms have a triple bond, i.e., C≡N. Examples of nitriles include, without limitation, acetonitrile, acrylonitrile, propionitrile, methoxyacetonitrile, methoxypropionitrile (MPN), propylnitrile, cyclopentanecarnonitrile, 4-cyanobenzaldehyde, and ethylene glycol bis (propionitrile) (EGBP). Like glymes, nitriles are chemically inert, aprotic polar solvents.

As used herein, the term "heterocyclic compounds" is used in its traditional sense to refer to a ring-structured chemical compound that has at least two different elements as members of its ring. As is known to those of skill in the art, the list of heterocyclic compounds is too extensive to list; thus, for purposes of this disclosure, the following list provides three examples of saturated and unsaturated heterocyclic compounds having nitrogen, oxygen, and sulfur as heteroatoms. It is understood that this list of heterocyclic compounds is intended to be exemplary and not limiting. Examples of saturated 3-atom rings include, without limitation, aziridine, oxirane, and thiirane. Examples of unsaturated 3-atom rings include, without limitation, azirine, oxirene, and thirteen. Examples of saturated 4-atom rings include, without limitation, azetidine, oxetane, and thietane. Examples of unsaturated 4-atom rings include, without limitation, azete, oxete, and thiete. Examples of saturated 5-atom rings include, without limitation, pyrrolidine, oxolane, and thiolane. Examples of unsaturated 5-atom rings include, without limitation, pyrrole, furan, and thiophene. Examples of saturated 6-atom rings include, without limitation, piperidine, oxane, and thiane. Examples of unsaturated 6-atom rings include, without limitation, pyridine, pyran, and thiopyran, Examples of saturated 7-atom rings include, without limitation, azepane, oxepane, and thiepane. Examples of unsaturated 7-atom rings include, without limitation, azepine, oxepine, and thiepine. Examples of saturated 8-atom rings include, without limitation, azocane, oxocane, and thiocane. Examples of unsaturated 8-atom rings include, without limitation, azocine, oxocine, and thiocine. Examples of saturated 9-atom rings include, without limitation, azonane, oxonane, and thionane. Examples of unsaturated 9-atom rings include, without limitation, azonine, oxonine, and thionine.

Metal halide batteries are redox batteries that use metal halide as a cathode in the presence of an oxidizing gas. Unlike lithium-ion and NiMH batteries, metal halide batteries are not manufactured with heavy metals; thus, metal halide batteries have potentially lower manufacturing costs than traditional lithium ion or NiMH batteries. In order to be suitable replacements for lithium-ion and NiMH batteries, metal halide batteries require optimization.

Described herein is a rechargeable battery comprising an anode, an electrolyte, and a metal halide cathode current collector contacting the electrolyte, wherein the electrolyte comprises (i) a mixed-solvent comprising at least two different organic liquid compounds, wherein at least one of the organic liquid compounds is a glyme-based compound having the chemical formula of $R^1O—(CR^2_2CR^2_2O)_n—R^1$, wherein, n is an integer greater than 0, $R^1$ is independently substituted or unsubstituted alkyl, alkenyl, alkynyl, aryl, or alkylaryl, $R^2$ is independently hydrogen or substituted or unsubstituted alkyl, alkenyl, alkynyl, aryl, or alkylaryl, and the volume fraction of the glyme-based compound is between 20 and 70 volume % of the total mixed-solvent, (ii) a metal halide that functions as an active cathode material, wherein the metal halide is dissolved in the mixed-solvent, and (iii) an oxidizing gas also dissolved in the mixed-solvent.

In one embodiment, the metal halide is dissolved in the mixed-solvent prior to the introduction of the oxidizing gas. In another embodiment, the metal halide and the oxidizing gas are introduced together into the mixed-solvent. In a further embodiment, the mixed-solvent solution is mixed ahead of time and added to the metal halide and oxidizing gas to form the electrolyte solution. In another embodiment, the individual ingredients of the mixed-solvent solution are added, in no particular order or sequence, with the metal halide, or the metal halide and the oxidizing gas, to form the electrolyte solution.

In another embodiment, each individual $R^1$ of the glyme-based compound is independently selected from the group consisting of a $C_1$-$C_{10}$ linear alkyl, a $C_3$-$C_{10}$ branched alkyl, a $C_3$-$C_{10}$ cyclic alkyl, a $C_2$-$C_{10}$ linear alkenyl, a $C_3$-$C_{10}$ branched alkenyl, a $C_3$-$C_{10}$ cyclic alkenyl, and a $C_5$-$C_{10}$ aryl group; and each individual $R^2$ of the glyme-based compound is independent selected from the group consisting of hydrogen, a $C_1$-$C_{10}$ linear alkyl, a $C_3$-$C_{10}$ branched alkyl, a $C_3$-$C_{10}$ cyclic alkyl, a $C_2$-$C_{10}$ linear alkenyl, a $C_3$-$C_{10}$ branched alkenyl, a $C_3$-$C_{10}$ cyclic alkenyl, and a $C_5$-$C_{10}$ aryl.

In a further embodiment, the alkyl, alkenyl, and/or aryl group of the $R^1$ and $R^2$ of the glyme-based compound is substituted with a halogen atom. Each $R^1$ may thus be independently selected from the group consisting of a $C_1$-$C_{10}$ linear alkyl halide, a $C_3$-$C_{10}$ branched alkyl halide, a $C_3$-$C_{10}$ cyclic halide alkyl group, a $C_2$-$C_{10}$ linear alkenyl halide group, a $C_3$-$C_{10}$ branched alkenyl halide group, a $C_3$-$C_{10}$ cyclic alkenyl halide group, and a $C_5$-$C_{10}$ aryl halide group; and each $R^2$ may be independently selected from the group consisting of hydrogen, a $C_1$-$C_{10}$ linear alkyl halide, a $C_3$-$C_{10}$ branched alkyl halide, a $C_3$-$C_{10}$ cyclic halide alkyl group, a $C_2$-$C_{10}$ linear alkenyl halide group, a $C_3$-$C_{10}$ branched alkenyl halide group, a $C_3$-$C_{10}$ cyclic alkenyl halide group, and a $C_5$-$C_{10}$ aryl halide group.

In another embodiment, some or all of the carbon atoms of the alkyl, the alkenyl, and/or the aryl of the $R^1$ and $R^2$ of the glyme-based compound is replaced by an element selected from the group consisting of a nitrogen atom, an oxygen atom, and a silicon atom. Each $R^1$ may thus be independently selected from the group consisting of an $X_1—X_{10}$ linear alkyl, an $X_3—X_{10}$ branched alkyl, a $X_3—X_{10}$ cyclic alkyl, a $X_2—X_{10}$ linear alkenyl, a $X_3—X_{10}$ branched alkenyl, a $X_3—X_{10}$ cyclic alkenyl, and a $X_5—X_{10}$ aryl, wherein each X is a carbon, a nitrogen, an oxygen, or a silicon atom; and each $R^2$ may be independently selected from the group consisting of hydrogen, an $X_1—X_{10}$ linear alkyl, an $X_3—X_{10}$ branched alkyl, a $X_3—X_{10}$ cyclic alkyl, a $X_2—X_{10}$ linear alkenyl, a $X_3—X_{10}$ branched alkenyl, a $X_3—X_{10}$ cyclic alkenyl, and a $X_5—X_{10}$ aryl, wherein each X is a carbon, a nitrogen, an oxygen, or a silicon atom.

The addition of a glyme-based solvent to an electrolyte solution improves the performance of metal halide batteries within a volume fraction range. The amount of the glyme-based solvent to be added to an electrolyte solution is approximately 20% to approximately 70% of the total volume of the solution. The remaining 20-70% volume of the solution is the metal halide (e.g., LiI in solid form) and one or more additional solvents forming a mixed-solvent electrolyte solution. Such additional solvents include, without limitation, nitriles and/or heterocyclic compounds. Example 1 describes a general procedure for fabrication of a metal halide battery cell using lithium-iodide (LiI) as an active cathode material, carbon nanoparticle as a conductive additive to the cathode, a lithium metal foil anode, a glyme-based solvent, a nitrile-based solvent, and a heterocyclic compound.

Metal halides that may be used to prepare the electrolyte formulations described herein include any metal halide that comprises a salt that dissociates into: (i) an ion selected from the group consisting of I, Br, Cl, and F; and (ii) an ion selected from the group consisting of $Li^+$, $Mg^{2+}$, $Al^{3+}$, and $Na^+$.

In one embodiment, the active cathode material may comprise one or more of Li, Mg, Al, and Na. Solely for purposes of illustration, and without intending to be limiting, the metal halide, LiI, will be described herein as an exemplary metal halide for the active cathode material.

In another embodiment, the electrolyte may include one or more lithium salts (in addition to LiI). Examples of such additional lithium salts include, without limitation, lithium nitrate ($LiNO_3$), lithium fluoride (LiF), lithium bis(trifluoromethanesulfonyl)imide (LiTFSI; $LiC_2F_6NO_4S_2$), lithium trifluoromethanesulfonate ($LiCF_3SO_3$), lithium hexafluorophosphate ($LiPF_6$), lithium hexafluoroarsenate ($LiAsF_6$), lithium perchlorate ($LiClO_4$), and lithium tetrafluoroborate ($LiBF_4$).

Oxidizing gases that may be used for the electrolyte include, without limitation, oxygen, air, nitric oxide, nitrogen dioxide, and mixtures and combinations thereof.

Examples of materials that may be used for the anodes of the rechargeable batteries described herein include, without limitation, one or more alkali metals and/or one or more alkali earth metals.

Examples of materials that may be used for the cathode current collectors of the rechargeable batteries include, without limitation, porous carbon materials and compatible metals. Examples of porous carbon materials include, without limitation, carbon cloth, carbon nanoparticles, polymer binders, and combinations thereof. Examples of compatible metals include, without limitation, stainless steel, copper, nickel, titanium, aluminum, and combinations and alloys thereof.

As will be appreciated by those of skill in the art, the batteries described herein will be manufactured for sale in a cell package. Examples of such cell packages include, without limitation, pouch cells, cylindrical cells, prismatic cells, coin cells, and SWAGELOK® cells (Swagelok Company, Solon, OH, USA).

The working range and performance of metal halide batteries manufactured with glyme-based electrolytes depend upon the amount of metal halide loaded in the cell. Where the metal halide battery has an optimal amount of both LiI loading and glyme-based solvent, the resulting metal halide battery has a high capacity at fast charging rates. In FIG. 1, at an LiI loading between approximately 8-12 mg/cm$^2$, the battery operates with a glyme-based electrolyte (e.g., DME:MPN; Example 2) at a volume fraction between 0.0 to 0.7. Within this LiI loading and electrolyte volume fraction, the metal halide battery shows best performance at an LiI loading of ~10 mg/cm$^2$ and an electrolyte volume fraction of ~0.5. By contrast, at an LiI loading between approximately 35-38 mg/cm$^2$, the battery operates with a mixed-solvent glyme-based electrolyte at a volume fraction between 0.25-0.4. Within this LiI loading and electrolyte volume fraction, the metal halide battery shows best performance at an LiI loading of ~37 mg/cm$^2$ and an electrolyte volume fraction of ~0.3.

Figure 2A:
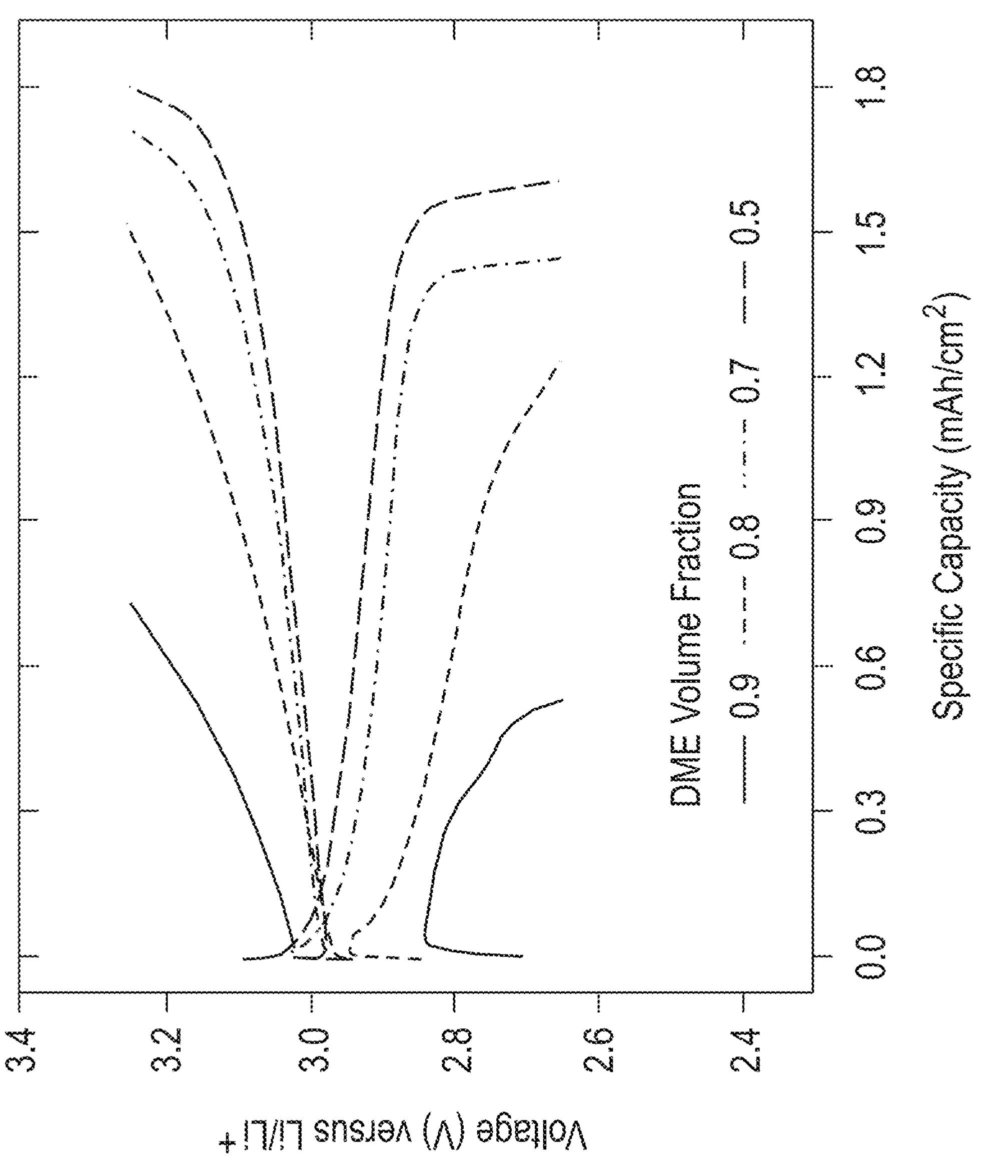
FIGS. 2A and 2B plot performance of metal halide battery cells with different volume fractions of 1,2-dimethoxyethane (DME) and methoxypropionitrile (MPN) at a lithium-iodide (LiI) loading of ~10 mg/cm$^2$.
Figure 2B:
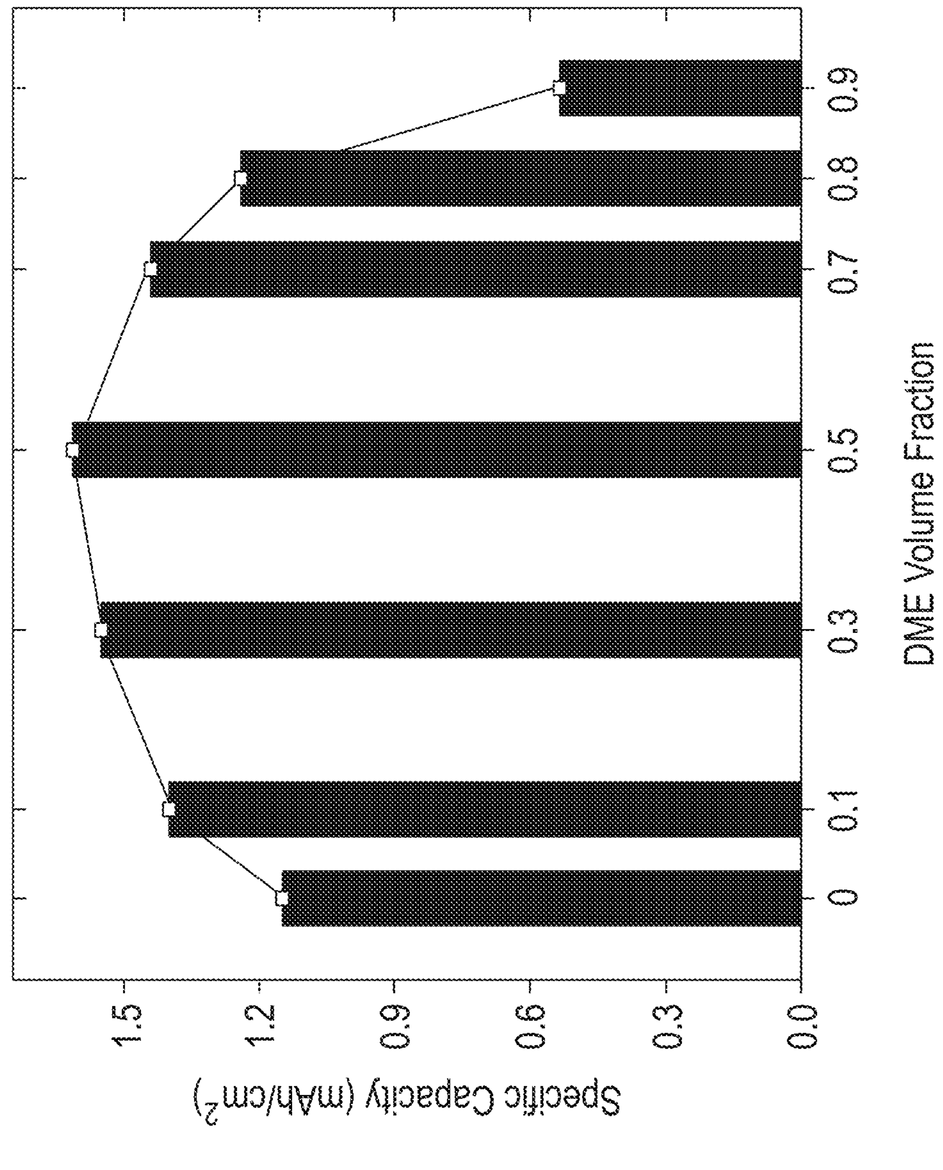

Example 2 describes the procedure for preparing glyme-based mixed-solvent electrolyte solutions with low LiI loading of ~10 mg/cm$^2$, DME as the glyme, and MPN as the nitrile. Several electrolyte solutions were prepared with the following seven volume ratios of DME:MPN: 90:1, 80:20, 70:30, 50:50, 30:70, 10:90, and 0:100. FIGS. 2A and 2B show the performance of the different volume fractions on the metal halide battery at the ~10 mg/cm$^2$ LiI loading. FIG. 2A shows the charge-discharge profiles of the battery at a current density of 5 mA/cm$^2$, and FIG. 2B shows the discharge specific capacities of the battery versus the DME volume fraction. FIGS. 2A and 2B show that of the seven different mixed-solvent electrolyte solutions, the DME:MPN 50:50 electrolyte solution demonstrated the highest specific capacity of 1.65 mAh/cm$^2$.

Figure 3A:
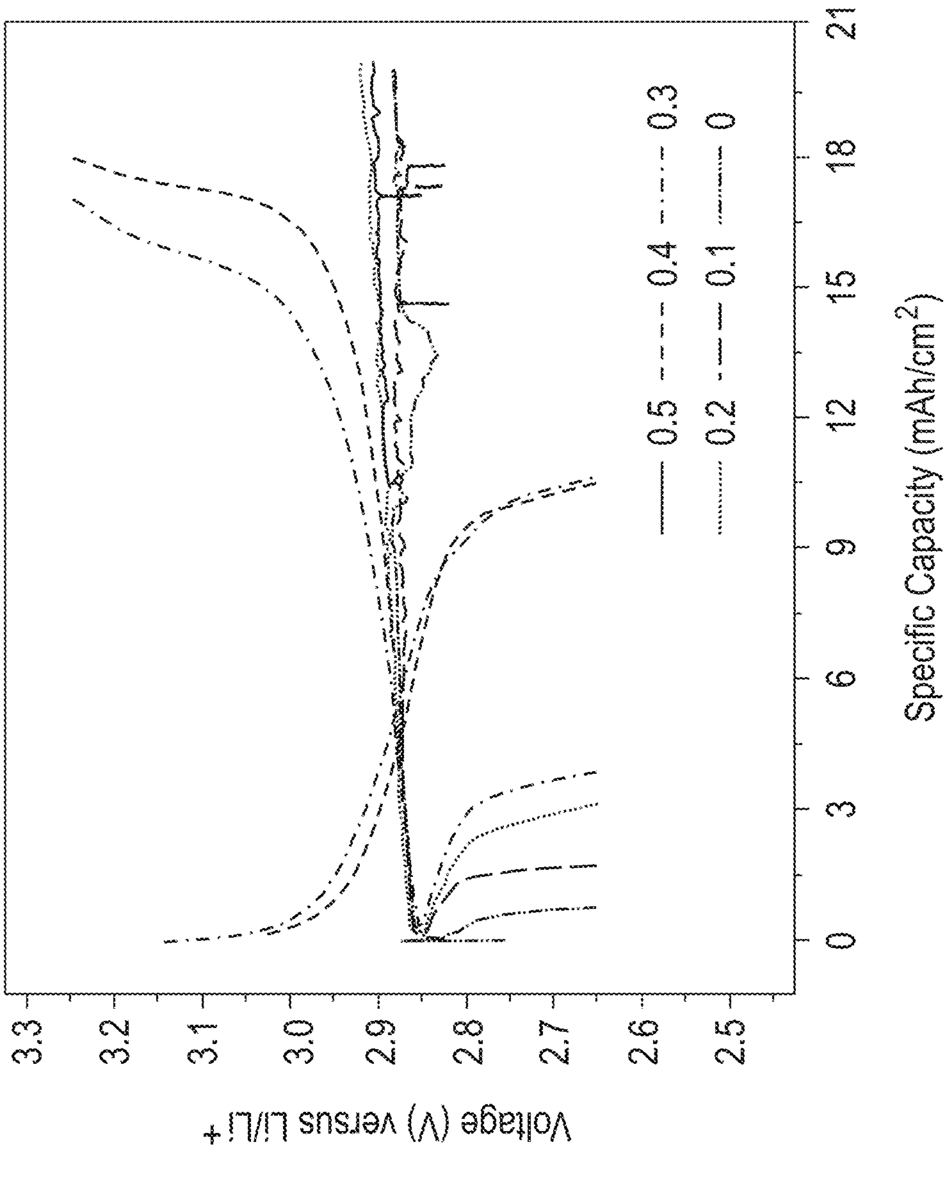
FIGS. 3A and 3B plot performance of metal halide battery cells with different volume fractions of DME and MPN at an LiI loading of ~37 mg/$cm^2$.
Figure 3B:
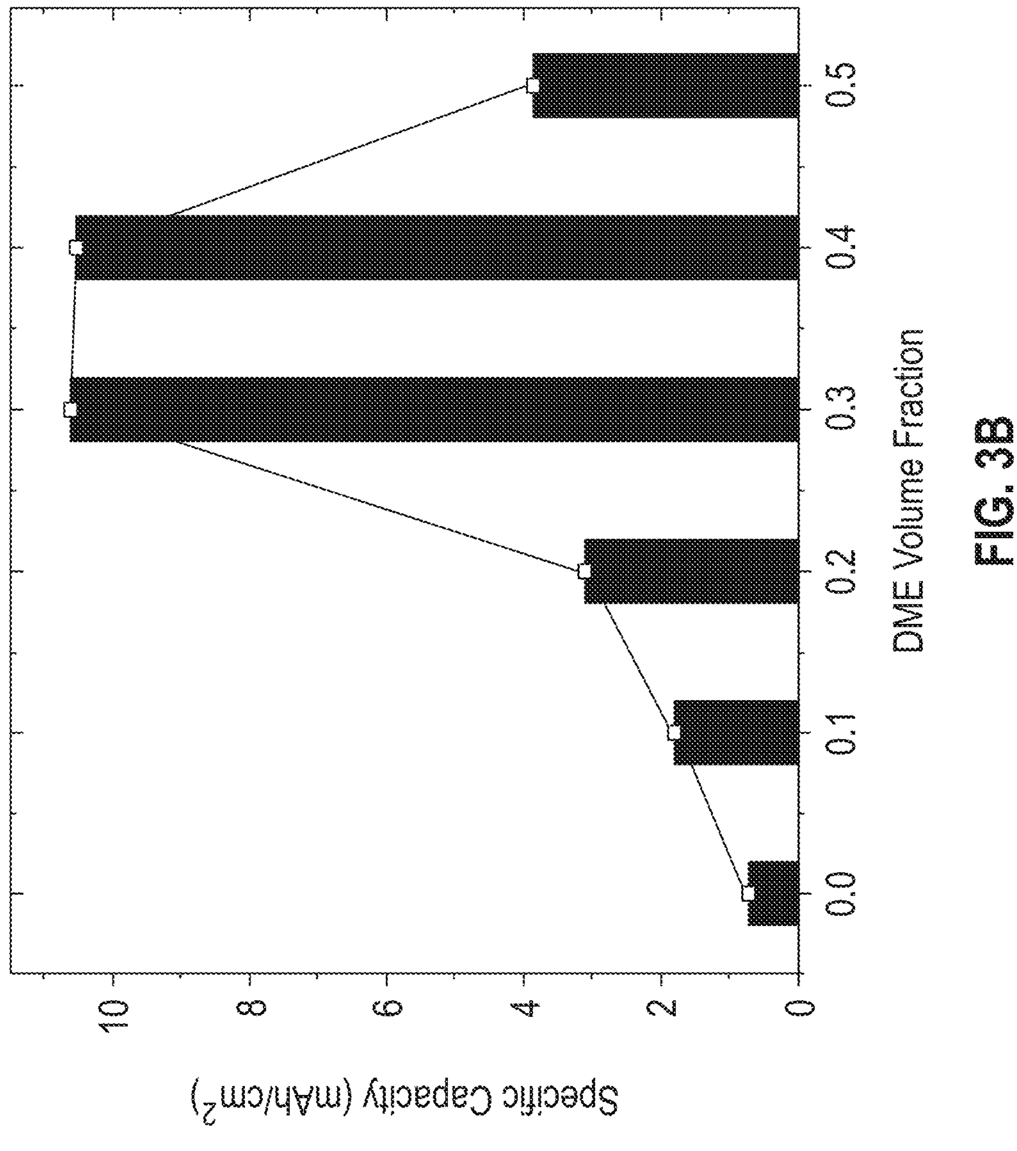
Figure 4:
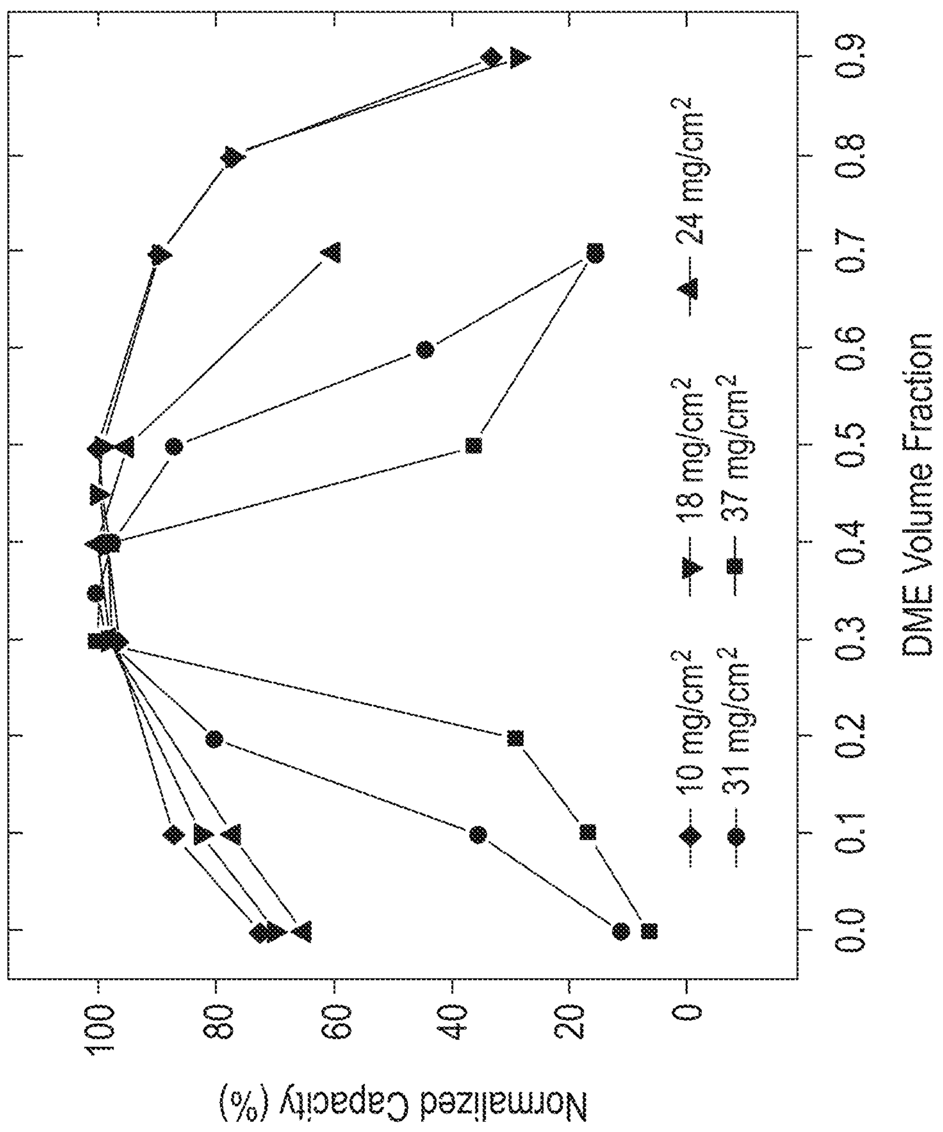
FIG. 4 is a graph showing normalized capacities of various volume fractions of DME against various LiI loadings.

Example 3 repeats the experiment of Example 2, but with a high LiI loading of ~37 mg/cm$^2$ and the following slightly different volume ratios of DME:MPN in the electrolyte solution: 50:50, 40:60, 30:70, 20:80, 10:90, and 0:100. FIGS. 3A and 3B show the performance of the different volume fractions on the metal halide battery at the ~37 mg/cm$^2$ LiI loading. FIG. 3A shows the charge-discharge profiles of the battery at a current density of 1 mA/cm$^2$ and FIG. 3B shows the discharge specific capacities of the battery versus the DME volume fraction. FIGS. 3A and 3B show that of the six different mixed-solvent electrolyte solutions, the DME:MPN 30:70 electrolyte solution demonstrated the highest specific capacity of 10.6 mAh/cm$^2$. In Example 4, the performance of a metal halide battery was tested with different volume fractions of DME:MPN (from 0:100 to 90:10 in steps of 10) and five different LiI loadings (10, 18, 24, 31, and 37 mA-hr/cm$^2$). FIG. 4 plots the various volume fractions of the glyme-based solvent, DME, against the various LiI loadings. FIG. 4 shows that the discharge capacities and voltaic efficiencies of the battery vary depending upon the DME volume fraction. For example, at an LiI loading of ~10 mg/cm$^2$, the normalized discharge capacities are between ~75-100% (i.e., greater than 1 mAh/cm$^2$) from 0 to 0.8 volume fraction of DME at a current density of 5 mA/cm$^2$, with a highest value at 0.5 volume fraction of DME (i.e., 1.6 mAh/cm$^2$). As shown in FIG. 4, 25 mg/cm$^2$ is the loading limit of the metal halide in the absence of the glyme-based additive described herein. With the addition of the glyme-based additive, the effective cathode loading of the metal halide/cathode surface area increases to >25 mg/cm$^2$. In one embodiment, the cathode loading of the metal halide/cathode surface area is in the range of 24-31 mg/cm$^2$. In a further embodiment, the cathode loading of the metal halide/cathode surface area is in the range of at least 28 mg/cm$^2$. In another embodiment, the cathode loading of the metal halide/cathode surface area is 31 mg/cm$^2$.

Examples 2, 3, and 4 show that at higher loadings of LiI, the performance of a metal halide battery may suffer from increased shuttling behavior during charge resulting in reduced specific discharge capacities. The reduced capacity of a metal halide battery, however, can be improved by adjusting the composition of the solvents in the electrolyte. For example, the cycle life of the rechargeable metal halide battery described herein may be improved by including a nitrile or heterocyclic compound in the mixed-solvent electrolyte.

Figure 5A:
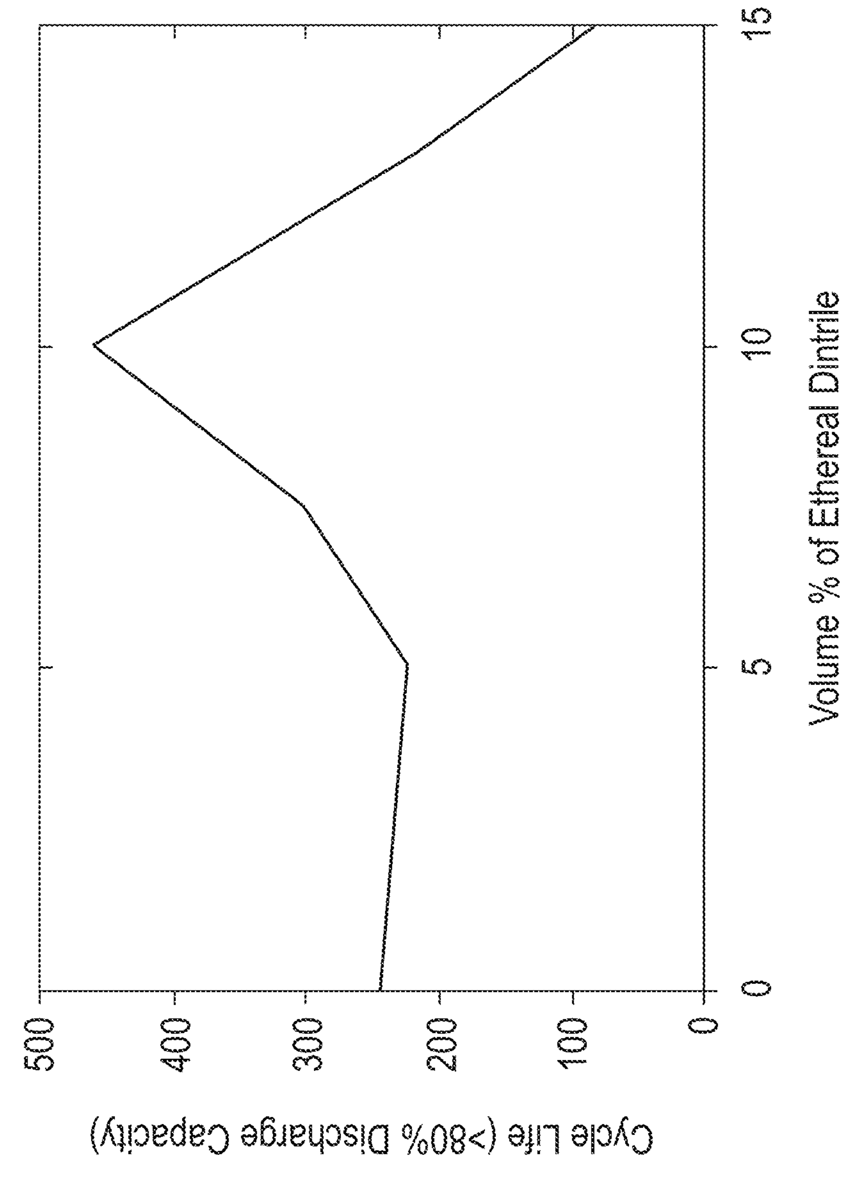
FIGS. 5A and 5B plot performance of metal halide battery cells with an LiI loading of ~10 mg/$cm^2$ at a current density of 5 mA/$cm^2$.
Figure 5B:
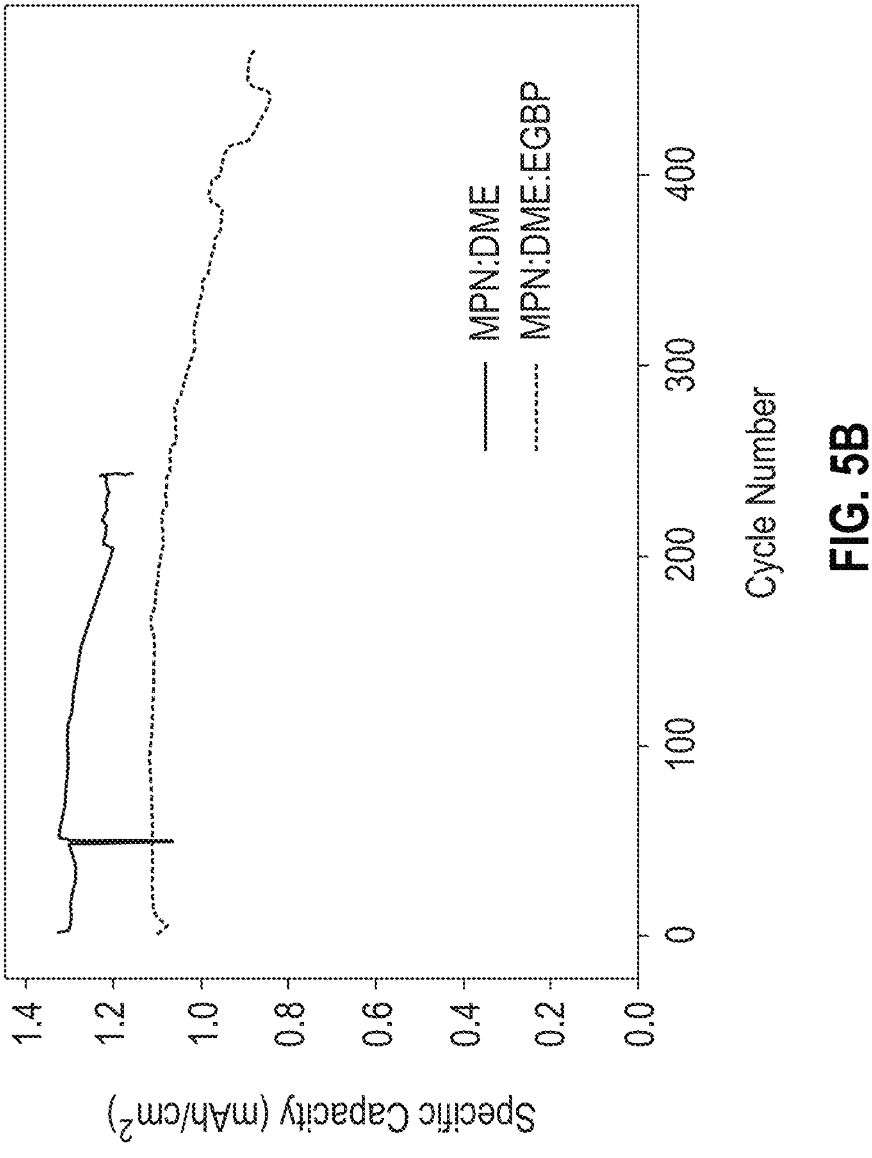

Example 5 describes the addition of the ethereal dinitrile, ethylene glycol bis(propionitrile) (EGBP) to a glyme-based electrolyte solution. As shown in FIG. 5A, the addition of EGBP to a glyme-based electrolyte solution comprising DME and MPN improves the cycle life of a metal halide battery. In FIG. 5A, the cycle life improvement was observed within the range of 6.5% to 12.5% volume fraction of the EGBP, with the highest value of ~100% cycle life improvement seen at 10% volume fraction of EGBP. FIG. 5B shows that the inclusion of EGBP to the glyme-based electrolyte doubles the cycle number of a metal halide battery without causing a significant reduction in the specific capacity of the battery. In FIG. 5B, the specific capacity of the electrolyte solution with the EGBP showed a reduction of ~0.2 mAh/cm$^2$ in the specific capacity of the metal halide battery cell at an LiI loading of ~10 mg/cm$^2$ and a current density of 5 mA/cm$^2$. While the electrolyte solution without the EGBP had a higher overall specific gravity (~1.3 mAh/cm$^2$), the cycle life of the metal halide battery stopped at approximately 200, versus over 400 with the inclusion of the EGBP.

Figure 6:
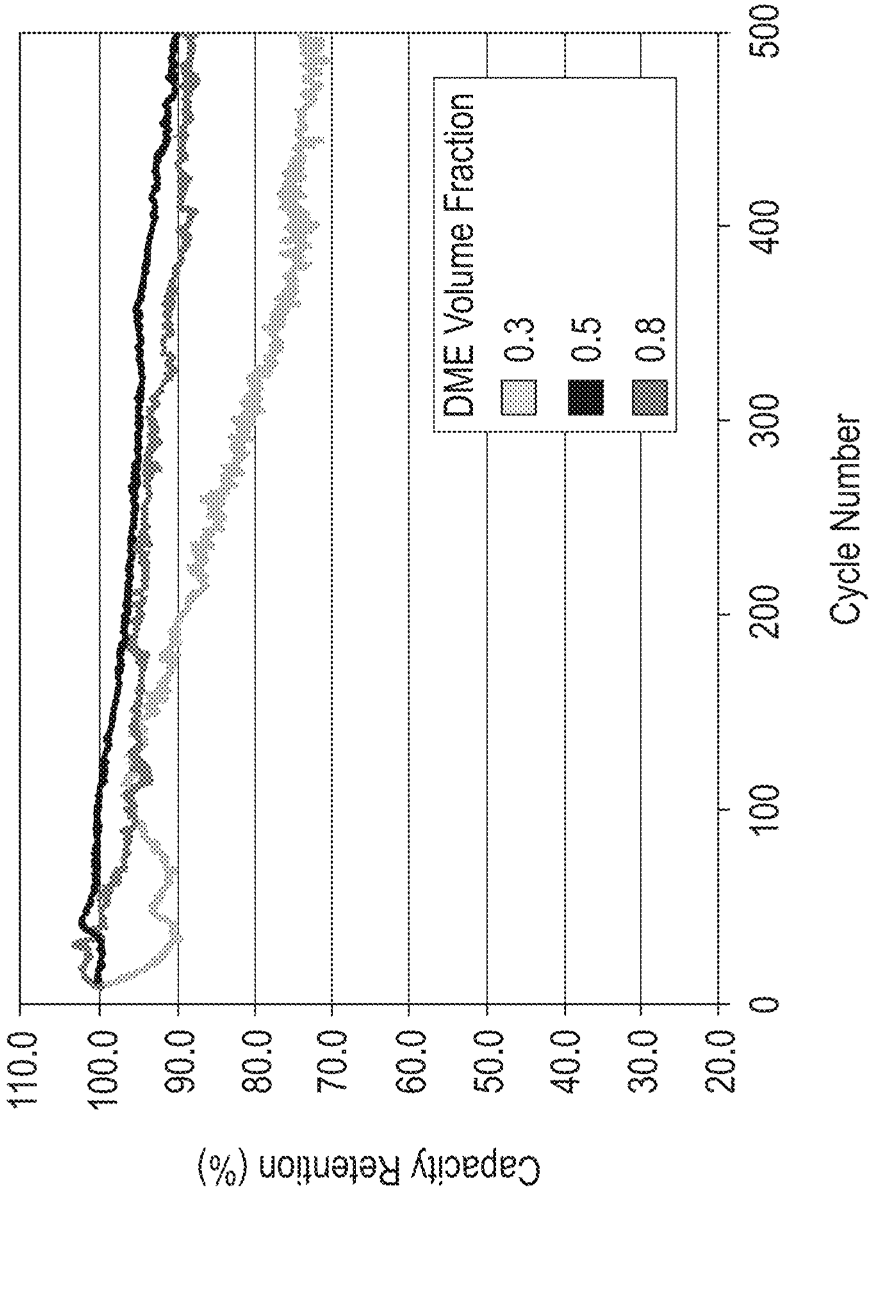
FIG. 6 is a graph showing cycle life variation with different volume fractions of DME with 1,3-dioxolane (DOL) at a LiI loading of ~10 mg/$cm^2$ and a current density of 3 mA/$cm^2$.

Example 6 describes the addition of the heterocyclic compound, 1,3-dioxolane (DOL) to a glyme-based electrolyte solution. As shown in FIG. 6, the addition of DOL to a DME electrolyte solution results in increased capacity retention over an electrolyte solution of just DME alone.

The descriptions of the various aspects and/or embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the aspects and/or embodiments disclosed herein.

EXPERIMENTAL

The following examples are set forth to provide those of ordinary skill in the art with a complete disclosure of how to make and use the aspects and/or embodiments of the invention as set forth herein. While efforts have been made to ensure accuracy with respect to variables such as amounts, temperature, etc., experimental error and deviations should be taken into account. Unless indicated otherwise, parts are parts by weight, temperature is degrees centigrade, and pressure is at or near atmospheric. All components were obtained commercially unless otherwise indicated.

Example 1

General Procedure for Cell Fabrication

LiI was used as the active cathode material for cell fabrication. The LiI was placed in a vial and dried on a hot plate inside an argon filled glovebox (<0.1 ppm $H_2O$, $O_2$) at 120° C. for over 12 hours. A glyme-based compound, a nitrile-based compound, and a heterocyclic compound were stored in separate vials with 20 mg of molecular sieve (4 Å) overnight. Next, mixed-solvent electrolyte solutions were prepared with the following compounds in volume ratios of 90:10, 80:20, 70:30, 50:50, 30:70, and 10:90: (i) the glyme-based compound and the nitrile-based compound, and separately, (ii) the glyme-based compound and the heterocyclic compound. Each mixed-solvent electrolyte solution was used to soak a quartz filter separator on top of the lithium metal anode. Carbon nanoparticle was used as a conductive additive to cathode materials. LiI was dissolved in the mixed-solvent electrolyte solution. All cell assembly was carried out in a glovebox. A lithium metal foil anode, the electrolyte wetted separator, and the carbon cathode were placed in order within a Swagelok-type cell equipped with both inlet and outlet tubing for oxygen flow. Oxygen gas was introduced from the inlet tubing, purged, and completely replaced the argon gas inside the cell.

Example 2

Capacity Variation with Different Volume Fractions of Glyme-Based Solvent in Electrolyte Solution at Relatively Low Loading of LiI (~10 mg/cm$^2$)

Performance of a metal halide battery with a lithium metal anode, a carbon cathode, and a mixed-solvent electrolyte solution of LiI dissolved in DME and MPN was tested with different volume fractions of DME and MPN in the electrolyte solution. The following seven DME:MPN volume ratios were used to measure specific capacities (mAh/cm$^2$) of the battery cell normalized by the electrode area: 90:10, 80:20, 70:30, 50:50, 30:70, 10:90, 0:100. The carbon nanoparticle to LiI weight ratio was fixed at 30:70 and the amount of LiI loaded as part of the cathode materials was fixed at ~10±1 mg/cm$^2$. Among the seven different DME:MPN volume ratios, the 50:50 volume ratio showed the best specific capacity of 1.65 mAh/cm$^2$ at a current density of 5 mA/cm$^2$ (FIGS. 2A and 2B). Current density was calculated based on an applied current of 2.5 mA and an electrode area of 0.5 cm$^2$ (with both anode and cathode having the same area).

Example 3

Capacity Variation with Different Volume Fractions of Glyme-Based Solvent in Electrolyte Solution at Relatively High Loading of LiI (~37 mg/cm$^2$)

Performance of a metal halide battery with a lithium metal anode, a carbon cathode, and a mixed-solvent electrolyte solution of LiI dissolved in DME and MPN was tested with different volume fractions of DME and MPN in the electrolyte solution. The following six DME:MPN volume ratios were used to measure the specific capacities (mAh/cm$^2$) of the battery cell normalized by the electrode area: 50:50, 40:60, 30:70, 20:80, 10:90, 0:100. The carbon nanoparticle to LiI weight ratio was fixed at 30:70, and the amount of LiI loaded as part of the cathode materials was fixed at ~37±3 mg/cm$^2$. Among the six different DME:MPN volume ratios, the 30:70 volume ratio showed the best specific capacity of 10.6 mAh/cm$^2$ at a current density of 1 mA/cm$^2$ (FIGS. 3A and 3B).

Example 4

Normalized Capacity Variation with Different Volume Fractions of Glyme-Based Solvent in Electrolyte Solution at Different LiI Loadings Performance of a metal halide battery with a lithium metal anode, a carbon cathode, and a mixed-solvent electrolyte solution of LiI dissolved in DME and MPN was tested with different volume fractions of DME and MPN and different dissolved LiI concentrations in the DME and MPN mixed-solvent electrolyte solution. Batteries with ten different DME:MPN ratios between 0:100 and 90:10 were tested at five different LiI loadings (10, 18, 24, 31, and 37 mg/cm$^2$). Within each loading, capacity data were normalized to the capacity of the best performing volume ratio (FIG. 4). Across all tested LiI loadings, the best performing DME:MPN volume ratio was between 70:30 and 20:80.

Example 5

Cycle Life Variation with an Electrolyte Solution Having Different Volume Fractions of Glyme-Based Solvent and Ethereal Dinitrile Performance of a metal halide battery with a lithium metal anode, a carbon cathode, and a mixed-solvent electrolyte solution of LiI dissolved in DME, MPN and different volume fractions of the ethereal dinitrile, ethylene glycol bis(propionitrile) (EGBP) was tested. The following EGBP volume percentages in 1:1 DME:MPN were used to measure the cycle life of the battery cell: 0%, 2.5% 5%, 7.5%, 10%, 12.5%, and 15%. The amount of LiI loaded was fixed at ~20±1 mg/cm$^2$. Among the different volume ratios of the DME:MPN:EGBP mixed-solvent electrolyte solution, the 45:45:10 volume ratio (the 0.1 EGBP volume fraction) showed the best cycle life behavior with the highest capacity retention over 450 cycles (FIG. 5A), which represented an increase of nearly 100% compared to the 1:1 DME:MPN alone (FIG. 5B.)

Example 6

Cycle Life Variation with an Electrolyte Solution Having Different Volume Fractions of Glyme-Based Solvent and Heterocyclic Compound A metal halide battery with a lithium metal anode, a carbon cathode, and a mixed-solvent electrolyte solution of LiI dissolved in DME and the heterocyclic compound, 1,3-dioxolane (DOL), was tested with different volume fraction of DME and DOL in the electrolyte solution. The following three DME:DOL volume ratios were used to measure the specific capacities (mAh/cm$^2$) of the battery cell normalized by the electrode area: 80:20, 50:50, and 30:70. The carbon nanoparticle to LiI weight ratio was fixed at 30:70, and the amount of LiI loaded as part of the cathode materials was fixed at ~10±1 mg/cm$^2$. Among the three different volume ratios of the DME:DOL mixed-solvent electrolyte solution, the 50:50 volume ratio (the 0.5 DME volume fraction) showed the best cycle life behavior with the highest capacity retention over 500 cycles (FIG. 6).

We claim:

1. A battery cell, comprising:
an anode;
an electrolyte having a volume; and
a cathode current collector contacting the electrolyte, wherein the electrolyte facilitates transport of ions between the anode and the cathode current collector,
wherein the electrolyte comprises:
(i) a mixed-solvent comprising a 1,2-dimethoxyethane and a methoxyproprionitrile, wherein
the 1,2-dimethoxyethane (DME) has a volume fraction between 30-40 volume % of the mixed-solvent,
(ii) a metal halide that functions as an active cathode material, wherein the metal halide is dissolved in the mixed-solvent at a cathode loading amount of between about 31 and 37 mg/cm$^2$ (metal halide/cathode surface area), and
(iii) an oxidizing gas dissolved in the mixed-solvent, and
wherein the metal halide is lithium iodide.

2. The battery cell of claim 1, wherein the mixed-solvent comprises a heterocyclic compound.

3. The battery cell of claim 2, wherein the heterocyclic compound is 1,3-dioxolane.

4. The battery cell of claim 1, wherein the electrolyte further comprises:
(iv) an additional lithium salt selected from the group consisting of lithium nitrate ($LiNO_3$), lithium fluoride (LiF), lithium bis(trifluoromethanesulfonyl)imide (LiTFSI; $LiC_2F_6NO_4S_2$), lithium trifluoromethanesulfonate ($LiCF_3SO_3$), lithium hexafluorophosphate ($LiPF_6$), lithium hexafluoroarsenate ($LiAsF_6$), lithium perchlorate ($LiClO_4$), and lithium tetrafluoroborate ($LiBF_4$).

5. The battery cell of claim 1, wherein the anode comprises one or more alkali metals and/or one or more alkali earth metals.

6. The battery cell of claim 1, wherein the cathode current collector comprises a porous carbon material and/or a metal.

7. The battery cell of claim 6, wherein the porous carbon material is selected from the group consisting of carbon cloth, carbon nanoparticles, polymer binders, and combinations thereof.

8. The battery cell of claim 1, wherein the oxidizing gas is selected from the group consisting of oxygen, air, nitric oxide, nitrogen dioxide, and mixtures and combinations thereof.

9. A rechargeable battery cell, comprising:
an anode;
a cathode current collector; and
an electrolyte having a volume that facilitates transport of ions between the anode and the cathode current collector, wherein the cathode current collector is in contact with the electrolyte and the electrolyte comprises:
(i) lithium iodide that functions as an active cathode material, wherein the lithium iodide is dissolved in a mixed-solvent at a cathode loading amount of between about 31 and 37 mg/cm$^2$ (lithium iodide/cathode surface area), and
(ii) an oxidizing gas dissolved in the mixed-solvent,
wherein the mixed-solvent comprises a 1,2-dimethoxyethane and a methoxypropionitrile, and
wherein a volume fraction of the 1,2-dimethoxyethane is between 30-40 volume % of the mixed-solvent.

10. The rechargeable battery cell of claim 9, wherein the electrolyte comprises an additional lithium salt selected from the group consisting of lithium nitrate ($LiNO_3$), lithium fluoride (LiF), lithium bis(trifluoromethanesulfonyl)imide (LiTFSI; $LiC_2F_6NO_4S_2$), lithium trifluoromethanesulfonate ($LiCF_3SO_3$), lithium hexafluorophosphate ($LiPF_6$), lithium hexafluoroarsenate ($LiAsF_6$), lithium perchlorate ($LiClO_4$), and lithium tetrafluoroborate ($LiBF_4$).

11. The rechargeable battery cell of claim 9, wherein the anode comprises one or more alkali metals and/or one or more alkali earth metals.

12. The rechargeable battery cell of claim 9, wherein the cathode current collector comprises a porous carbon material and/or a metal.

13. The rechargeable battery cell of claim 9, wherein the oxidizing gas is selected from the group consisting of oxygen, air, nitric oxide, nitrogen dioxide, and mixtures and combinations thereof.

14. The rechargeable battery cell of claim 9, wherein the mixed-solvent comprises a heterocyclic compound.

15. The rechargeable battery cell of claim 14, wherein the heterocyclic compound is 1,3-dioxolane.

16. A method of preparing an electrolyte having a volume for a metal halide rechargeable battery cell having an anode and a cathode current collector, the method comprising:
dissolving a metal halide in a mixed-solvent solution, wherein the metal halide functions as an active cathode material and is dissolved in the mixed-solvent at a cathode loading amount of between about 31 and 37 mg/cm$^2$ (metal halide/cathode surface area); and
introducing an oxidizing gas into the mixed-solvent solution,
wherein the mixed-solvent solution comprises a 1,2-dimethoxyethane and a methoxyproprionitrile, wherein
the 1,2-dimethoxyethane has a volume fraction between 30-40 volume % of the mixed-solvent solution, and
wherein the metal halide is lithium iodide.

17. The method of claim 16, wherein the mixed-solvent solution further comprises a heterocyclic compound.

18. A method of preparing an electrolyte having a volume for a metal halide rechargeable battery cell having an anode and a cathode current collector, the method comprising:
combining a metal halide, an oxidizing gas, and ingredients of a mixed-solvent solution, wherein the metal halide functions as an active cathode material and is dissolved in the mixed-solvent at a cathode loading amount of between about 31 and 37 mg/cm$^2$ (metal halide/cathode surface area) and the mixed-solvent solution comprises a 1,2-dimethoxyethane and a methoxypropionitrile,
wherein the 1,2-dimethoxyethane has a volume fraction between 30-40 volume % of the mixed-solvent solution, and
wherein the metal halide is lithium iodide.

19. The method of claim 18, wherein the mixed-solvent solution further comprises a heterocyclic compound.

* * * * *